(12) United States Patent
Specht

(10) Patent No.: US 8,075,019 B2
(45) Date of Patent: Dec. 13, 2011

(54) DEVICE FOR RESTRAINING A VEHICLE OCCUPANT

(75) Inventor: Martin Specht, Feldafing (DE)

(73) Assignee: Key Safety Systems, Inc, Sterling Heights, MI (US)

( * ) Notice: Subject to any disclaimer, the term of this patent is extended or adjusted under 35 U.S.C. 154(b) by 109 days.

(21) Appl. No.: 12/464,126

(22) Filed: May 12, 2009

(65) Prior Publication Data

US 2009/0309345 A1 Dec. 17, 2009

(30) Foreign Application Priority Data

Jun. 17, 2008 (DE) .......................... 10 2008 028 698

(51) Int. Cl.
*B60R 22/36* (2006.01)
(52) U.S. Cl. ...................................................... 280/806
(58) Field of Classification Search .................. 280/806, 280/807; 297/474–477, 479; 242/390.8, 242/390.9
See application file for complete search history.

(56) References Cited

U.S. PATENT DOCUMENTS

| | | | |
|---|---|---|---|
| 6,371,397 B1* | 4/2002 | Specht | 242/375.1 |
| 6,921,041 B2* | 7/2005 | Biller | 242/390.8 |
| 7,341,216 B2 | 3/2008 | Heckmayr | |
| 7,607,604 B2* | 10/2009 | Scherzinger et al. | 242/390.8 |
| 2003/0209624 A1* | 11/2003 | Biller | 242/390.8 |
| 2004/0108155 A1* | 6/2004 | Mori et al. | 180/268 |
| 2005/0011983 A1* | 1/2005 | Inuzuka et al. | 242/390.9 |
| 2005/0012320 A1* | 1/2005 | Tobata | 280/806 |
| 2005/0029382 A1* | 2/2005 | Inuzuka et al. | 242/390.9 |
| 2006/0071111 A1* | 4/2006 | Tanaka et al. | 242/374 |

FOREIGN PATENT DOCUMENTS

| | | | |
|---|---|---|---|
| JP | 58-078845 A | 5/1983 |
| JP | 58-101855 A | 6/1983 |
| JP | 04-201763 A | 7/1992 |
| JP | 2007-091031 A | 4/2007 |

\* cited by examiner

*Primary Examiner* — Faye M. Fleming
(74) *Attorney, Agent, or Firm* — Markell Seitzman

(57) ABSTRACT

A kit for a device for restraining a vehicle occupant includes a prefabricated seat belt retractor (1) that has a winding shaft (2) mounted in a rotatable manner in a retractor frame (4) to wind up and unwind the seat belt. The kit further includes a similarly prefabricated drive module (30) having an electric motor (32), the drive module being connectable to the retractor frame (4) in a rotationally fixed manner. Force-transmission elements are provided on the drive module (30) and on the seat belt retractor (1) that are to be connected to each other to transmit the torque from the electric motor (32) to the winding shaft (2) when the seat belt retractor (1) and drive module (30) are assembled. An assembled device for restraining a vehicle occupant and having the components of the kit is also disclosed. Further disclosed is a set of electrical components that when assembled with the seat belt retractor provide a signal indicating the state of locking device that can lock the winding shaft from unwinding a seat belt.

15 Claims, 10 Drawing Sheets

DEVICE FOR RESTRAINING A VEHICLE OCCUPANT

FIELD OF THE INVENTION

The present invention relates to a device for restraining a vehicle occupant including a seat belt.

BACKGROUND OF THE INVENTION

U.S. Pat. No. 6,371,397 B1 discloses a device for restraining a vehicle occupant that has a seat belt retractor and an electric motor in one unit. The torque of the electric motor is transmitted through a gear unit to a winding shaft that is mounted in a rotatable manner in a retractor frame of the seat belt retractor. The torque of the electric motor is used primarily in a pre-crash situation to eliminate the slack from the seat belt and to cause the movement of the belted occupant from an out-of-position state towards the seat back. The torque generated by the electric motor can also be used to adjust the wear comfort of the seat belt during normal driving operation, to return the seat belt back to the park position, and to effect an additional belt force limitation.

SUMMARY OF THE INVENTION

There is provided in accordance with one aspect of the present invention a kit for manufacturing a device for restraining a vehicle occupant comprising: a seat belt retractor that has a winding shaft mounted in a rotatable manner in a retractor frame to wind up and unwind a seat belt and a mechanical locking device for locking the winding shaft against rotation in a direction of unwinding the seat belt, and a force-transmission element connected to the winding shaft; a drive module having an electric motor, the drive module being connectable in a rotationally fixed manner to the retractor frame, a force-transmission element connected to the electric motor, said force-transmission elements are connected to each other for the purpose of transmitting the torque from the electric motor to the winding shaft; and a means for connecting the force transmission elements to one another.

There is provided in accordance with another aspect of the present invention a device for restraining a vehicle occupant comprising the assembled components of the kit.

There is provided in accordance with yet another aspect of the present invention a means for sensing when a mechanical locking device is activated in which a locking pawl acts between the winding shaft and the retractor frame, and in the event of locking is supported against the winding shaft and the retractor frame. In particular an electrical direct-current voltage, between the retractor frame and the winding shaft is provided. A short circuit is affected by the locking position of the locking pawl between the winding shaft and the retractor frame. The resulting change in potential can be detected by a signal transducer and a signal is generated that indicates the locking has occurred. When the locking device or the locking pawl is released from its locking position, the direct-current voltage is re-established between the winding shaft and the retractor frame, and this can also be sensed by the signal transducer and a signal is generated. In this way, it is possible to detect both the locking of the winding shaft and the unlocking of the winding shaft electrically, and indicating signals can be generated.

DETAILED DESCRIPTION OF THE INVENTION

Figure 1:
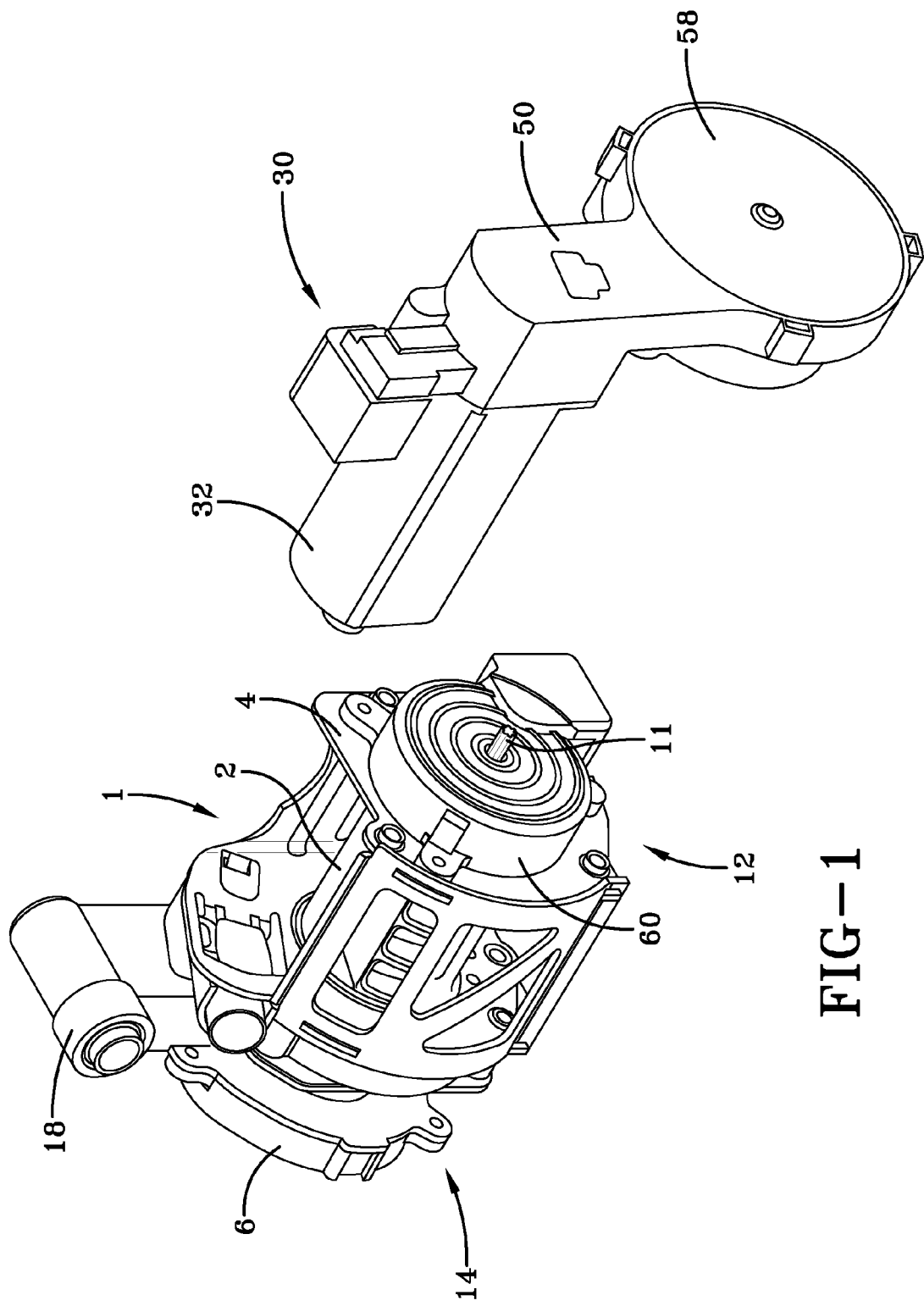
FIG. 1 is an exploded view of a first embodiment of a device for restraining a vehicle occupant.
Figure 4:
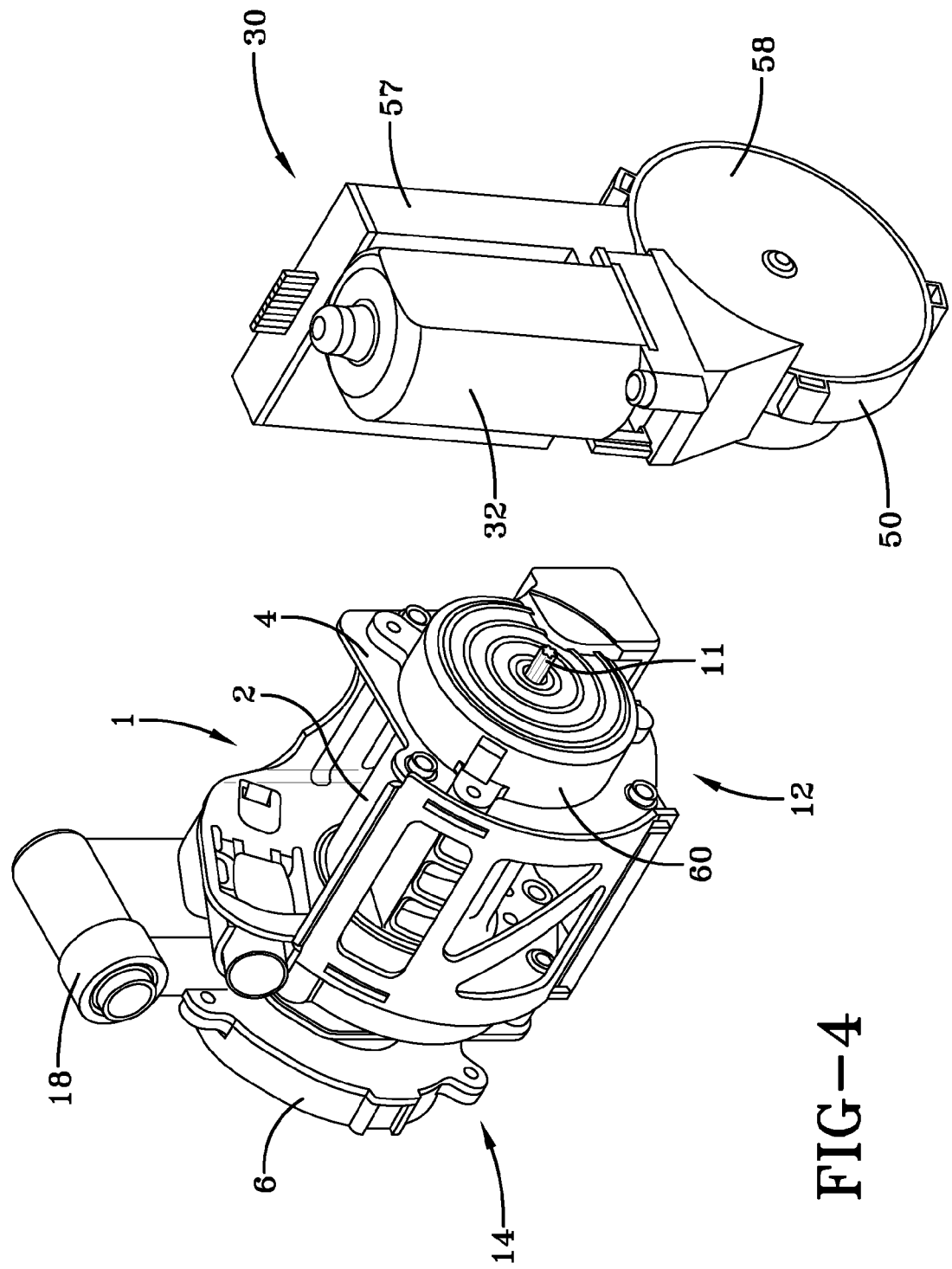
FIG. 4 is an exploded view of a second embodiment of a device for restraining a vehicle occupant.

FIGS. 1 and 4 are exploded views of embodiments of components of a kit for making a device for restraining a vehicle occupant. The kit comprises at least a seat belt retractor 1 and a drive module 30 having an electric motor 32, with a force-transmission element 11 connected to a winding shaft 2 of the seat belt retractor and a force-transmission element 42 connected to the electric motor 32, and a means for connecting the force transmission elements to one another.

The seat belt retractor 1 can be connected to a drive module 30 having an electric motor that is a prefabricated independent constructional unit. In known restraint devices for vehicle occupants electric motor and seat belt retractor are manufactured as constructional units matched to a specific vehicle type. The present invention provides a device for restraining a vehicle occupant of the type referenced wherein the components of are usable in a flexible manner. A seat belt retractor 1 provided for a device for restraining a vehicle occupant according to the present invention may be a substantially conventional seat belt retractor comprising a winding shaft 2 mounted in a rotatable manner in a retractor frame 4 for the purpose of winding up and unwinding a seat belt (not shown). Such a seat belt retractor can be installed in a motor vehicle as a stand alone seat belt retractor.

Figure 2:
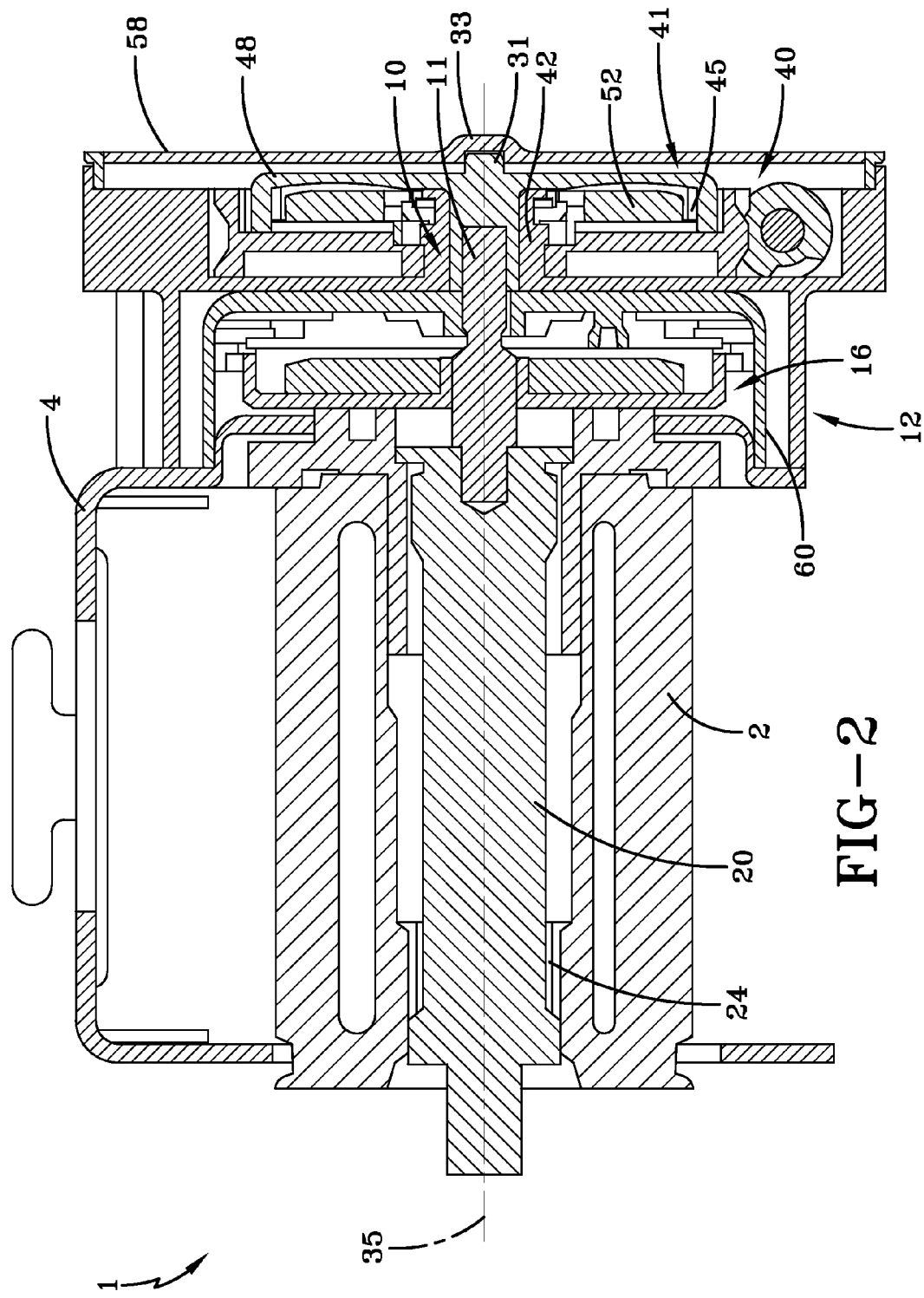
FIG. 2 is a cross-sectional drawing of the seat belt retractor of FIG. 1 and of components of the gear unit of the drive module connected to the seat belt retractor.

In the embodiments shown in FIGS. 1 and 4 the seat belt retractor 1 has on its spring side 14 a motive spring 6, with a locking device 16 located on a mechanism side 12 (FIG. 2). A pyrotechnic power tensioner 18 can be provided on spring side 14 to propel the winding shaft in the wind-up direction for quick retraction of the belt webbing in the event of a crash. The winding shaft 2 can include a force limiter 20 in the form of a torsion bar (FIG. 2.).

FIG. 2 is a cross-sectional view of the seat belt retractor of FIG. 1, with the structure at the spring side 14 omitted, and showing components of a gear unit of a drive module 30 connected to the seat belt retractor 1 on a mechanism side 12 of the seat belt retractor. A locking device 16 is located in a mechanism housing 60. The locking device has an inertia-sensitive design and can lock the winding shaft 2 against rotation with respect to the retractor frame 4.

The seat belt retractor 1 is designed such that a drive module 30, which supplies a torque, can be connected with the winding shaft 2 as a rotary-drive. A mechanical transmission interface 10 is provided that can be connected in a torque-coupled manner to the winding shaft 2.

Briefly stated, a drive module 30 having an electric motor is provided as an independent unit. The drive module is preferably designed such that it can alternatively be used as an actuator for moving vehicle components, for example, in electrical window lifters in vehicle doors, or steering column adjustment in vehicles, as an actuator for machine tools, printing machines and the like. The connection of the drive module to the seat belt retractor is effected here such that the drive module to support the torque generated by the electric motor can be connected in a rotationally fixed manner to the retractor frame of the seat belt retractor. Force-transmission elements forming a mechanical transmission interface are provided on the seat belt retractor and drive module, these elements ensuring transmission of the torque generated by the electric motor to the winding shaft of the seat belt retractor when the belt retractor and drive module are assembled. To transmit torque generated by the electric motor, the drive module can have a gear unit that is a reduction gear unit. A gear unit can be provided as a force-transmission element provided on the drive module, which force-transmission element can be connected to the force-transmission element of the seat belt retractor to transmit torque to the seat belt retractor. To ensure free rotation of the winding shaft of the seat belt retractor during normal vehicle operation, the drive module can have a clutch that engages the winding shaft to transmit the torque generated by the electric motor. The clutch can be either speed-sensitive, or a displacement-controlled clutch. The clutch can be provided in the drive module either separately or as a component of the gear unit, in particular on the gear-unit output.

If a power tensioner, for example, a pyrotechnic tensioner 18 is provided on the side of the seat belt retractor opposite the mechanism side, when the power tensioner drives the winding shaft 2 in the webbing wind-up direction this rotational motion occurring in the webbing wind-up direction is not transmitted to the gear unit 40. As a result, no additional feedback occurs. In the event the drive motions delivered by the power tensioner are transmitted directly to the winding shaft, the force limiter 20 in the form of a torsion bar disposed inside the winding shaft is not torqued during the power tensioning.

The force-transmission elements of the seat belt retractor and the drive module are preferably connectable to each other in an interlocking manner. This can involve plug-in shaft components that are hollow-shaft components and an insertable solid-shaft component. It is also possible to connect the two force-transmission elements to each other using an interposed connecting element. The mechanical transmission interface 10 can have a force-transmission element in the form of a connecting shaft 11 fixed to the torsion bar 20 of the seat belt retractor 1 and projecting from the mechanism housing 60. The part of the connecting shaft that is to be brought into rotary-drive connection with the drive module 30 preferably has a profile deviating from a circular form, for example, a toothed profile that can be brought into non-interlocking and interlocking connection with a complementary shaped force-transmission element 42 of the drive module 30. The mechanism side 12 of the connecting shaft is freely accessible for the non-interlocking and interlocking connection to the force-transmission element 42, and can, for example, extend beyond the mechanism housing 60 of the seat belt retractor. In an embodiment shown in FIGS. 4 and 5, a force-transmission element 11 provided on a seat belt retractor 1 comprises a solid shaft that is insertable into a force-transmission element 42 that is a hollow shaft. It is also possible to provide a force-transmission element 11 on the seat belt retractor 1 that is a hollow shaft and provide a force-transmission element 42 that is a shaft stub insertable into this hollow shaft. Further it is possible to connect in a non-interlocking and interlocking manner the two force-transmission elements 11, 42 by an interposed connecting element. The two force-transmission elements can be, for example, hollow shaft stubs into which a connecting element in the form of a connecting shaft piece is insertable in an interlocking manner.

Figure 5:
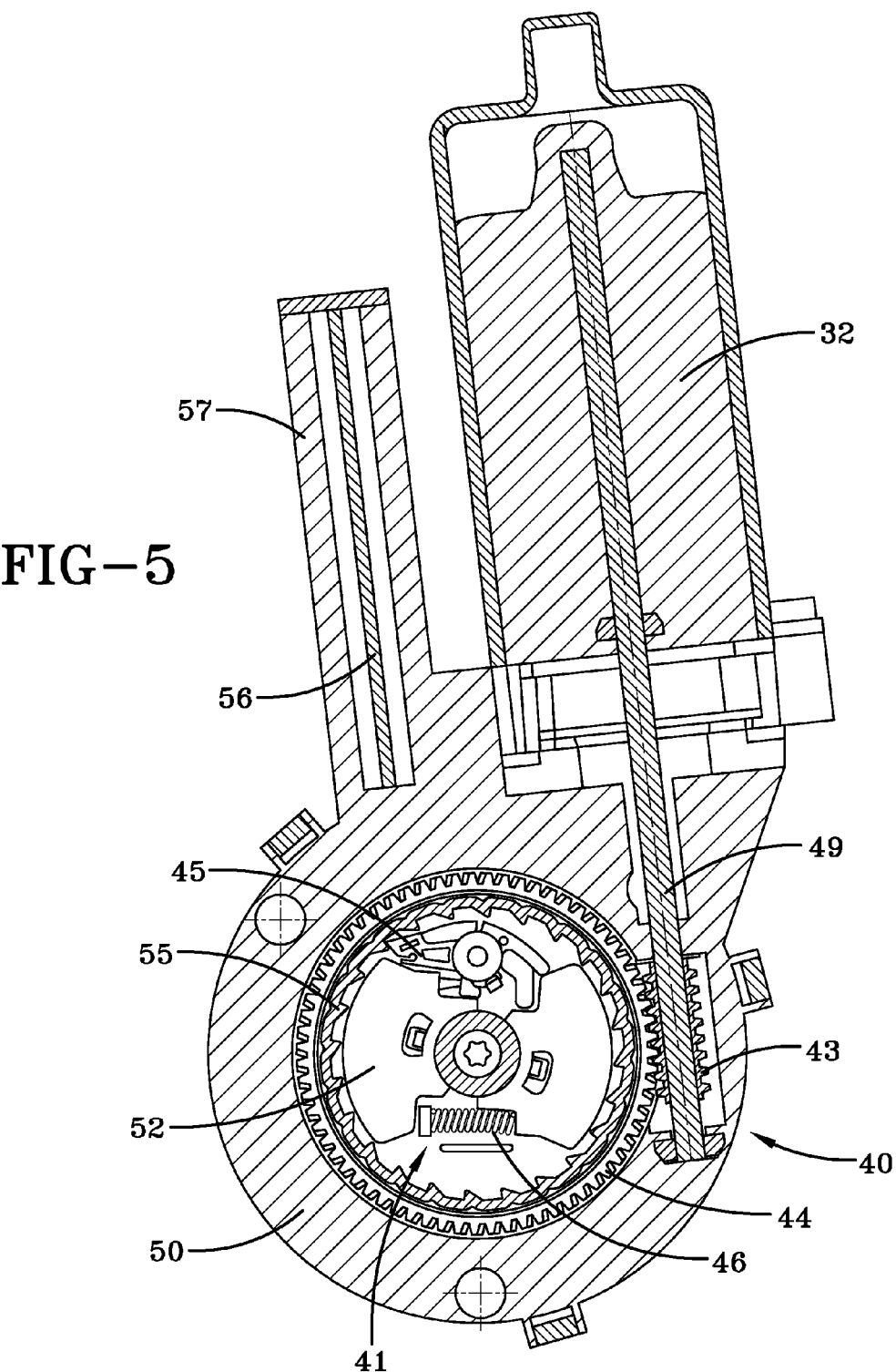
FIG. 5 is a section view of the drive module of the embodiment of FIG. 4.

The drive module 30 has an electric motor 32 that engages a gear unit 40 is in a rotary-drive connection. The gear unit 40 is preferably a reduction gear unit. The gear unit 40 has a worm gear 43 that meshes with a worm wheel 44. The worm gear 43 is attached to a gear shaft 49 that in the embodiment of FIGS. 1 and 3 also has gear wheel 51 that meshes with a gear wheel 54 on the motor output shaft. In the embodiment of FIGS. 4 and 5 the worm gear 43 resides on the motor output shaft that is also functions as a gear shaft 49.

The worm wheel 44 is mounted in a rotatable manner on a bearing journal 34 and is a clutch carrier for a clutch 41. The clutch 41 includes a speed-sensitive sensor comprising an inertial mass 52, also mounted in a rotatable manner on a bearing journal 34, and a sensor spring 46 (FIGS. 1, 3, 4, and 6). A clutch pawl 45 is mounted on the worm wheel 44. As shown, two clutch pawls 45 can be provided. A sensor spring 46 is also supported at its one end on the worm wheel 44, and at its other end on the inertial mass 52 that is mounted in a rotatable manner on the bearing journal 34 and locked by a retaining ring 47.

Figure 3:
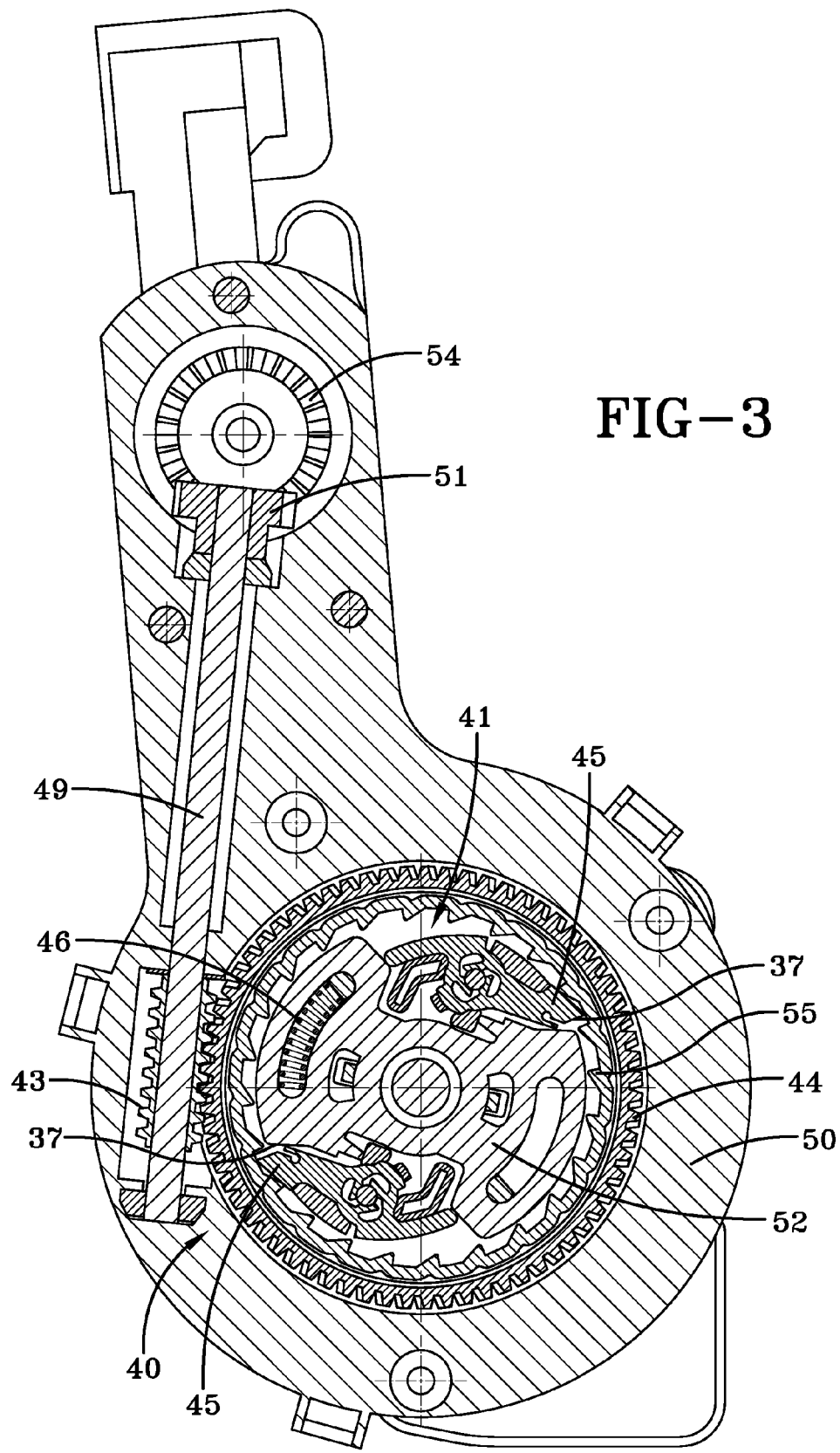
FIG. 3 is a section view of a gear unit provided in the drive module and clutch.
Figure 6:
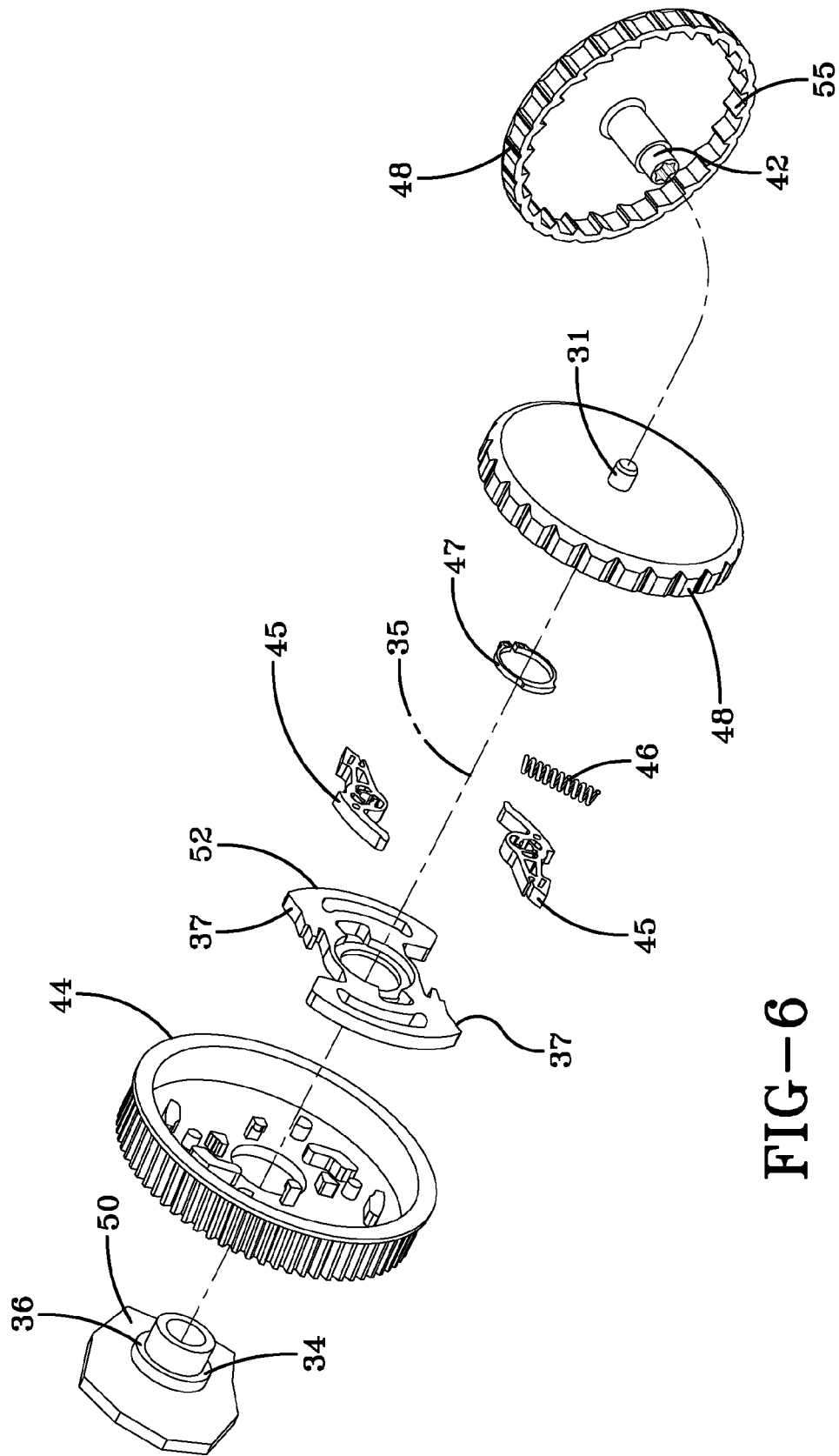
FIG. 6 is a perspective exploded view of components of the gear unit and clutch from the embodiment of FIG. 3.
Figure 7:
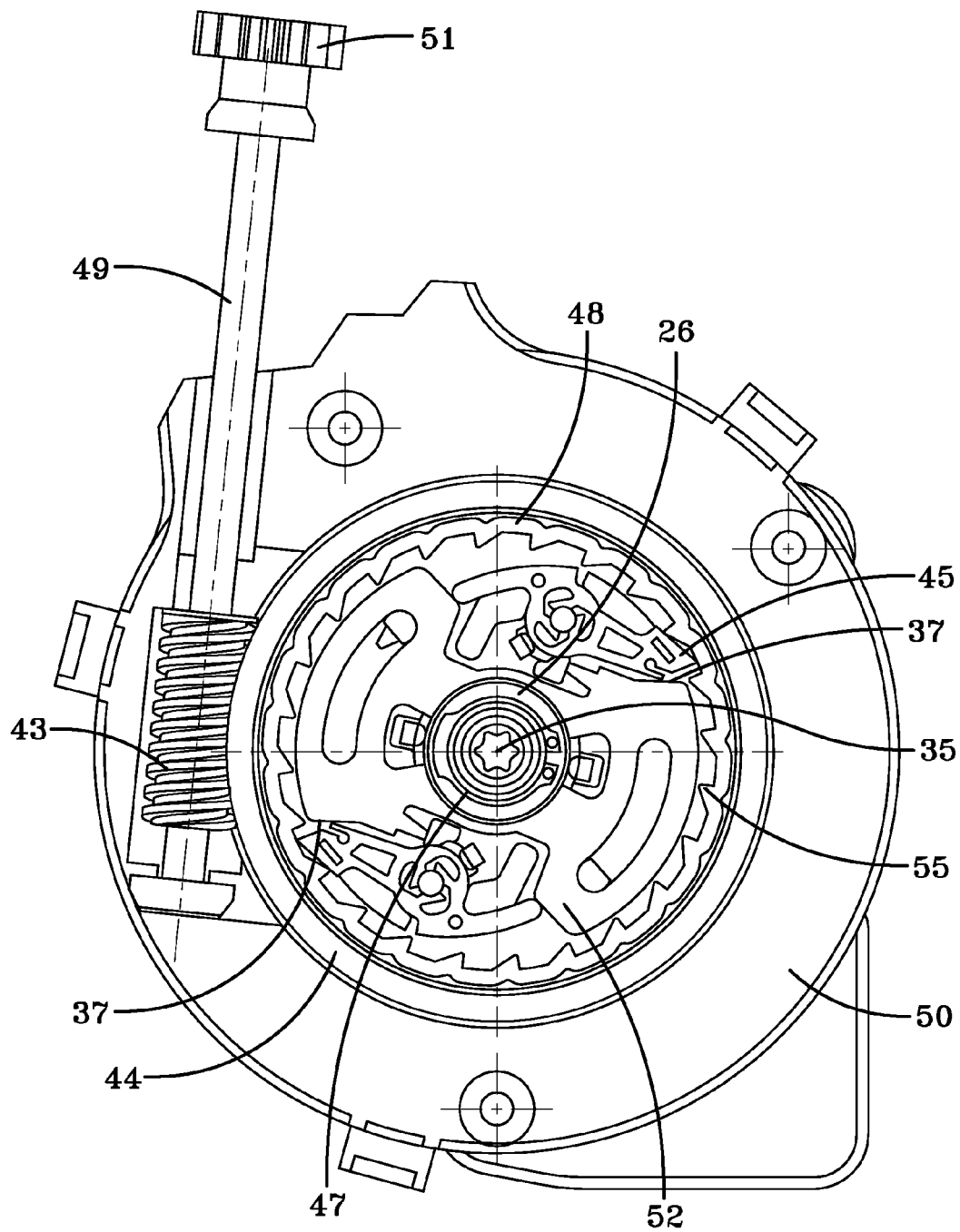
FIG. 7 is a side elevation view of another embodiment of the gear unit and clutch.
Figure 8:
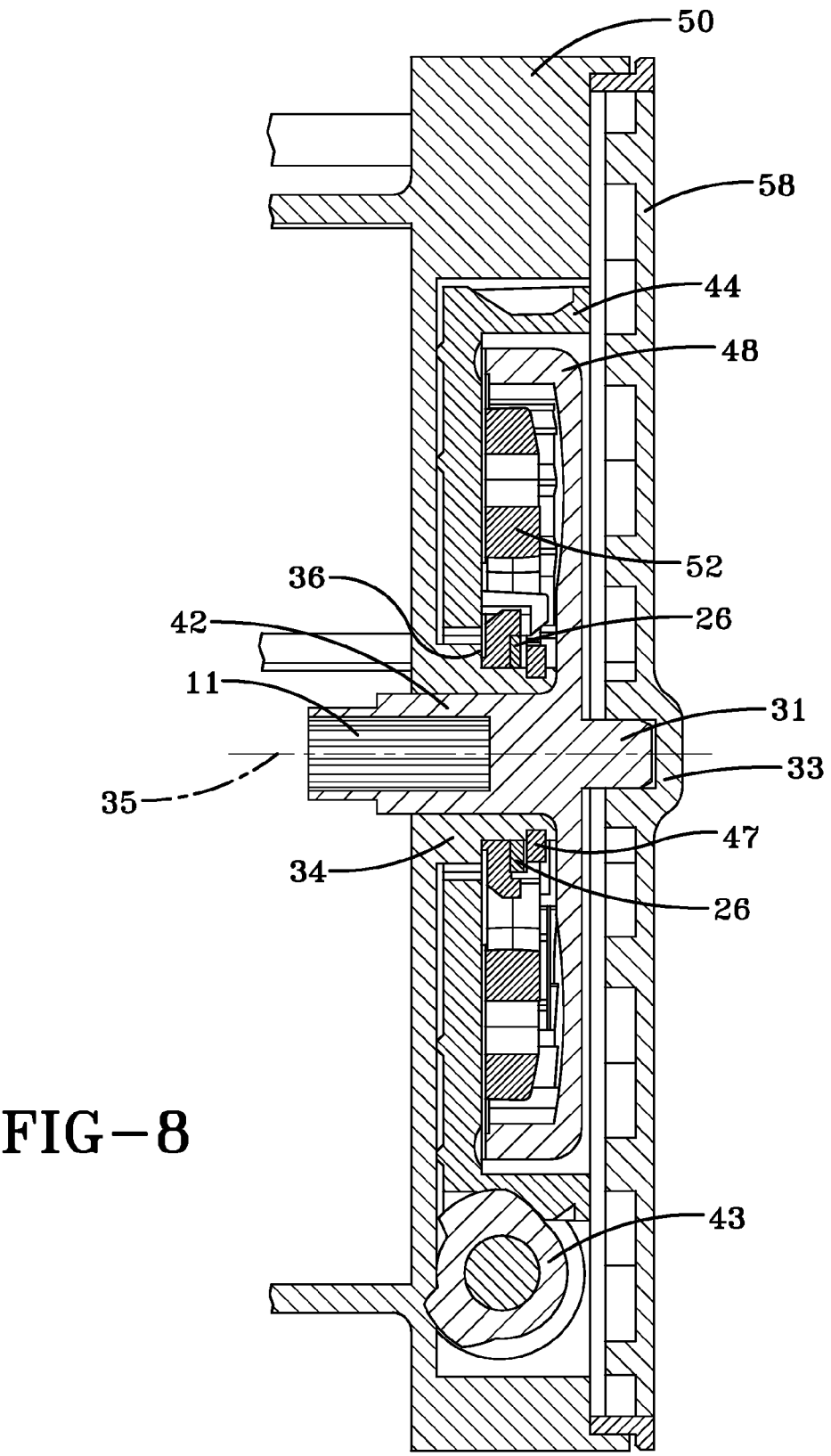
FIG. 8 is a section view of the embodiment shown in FIG. 7.
Figure 9:
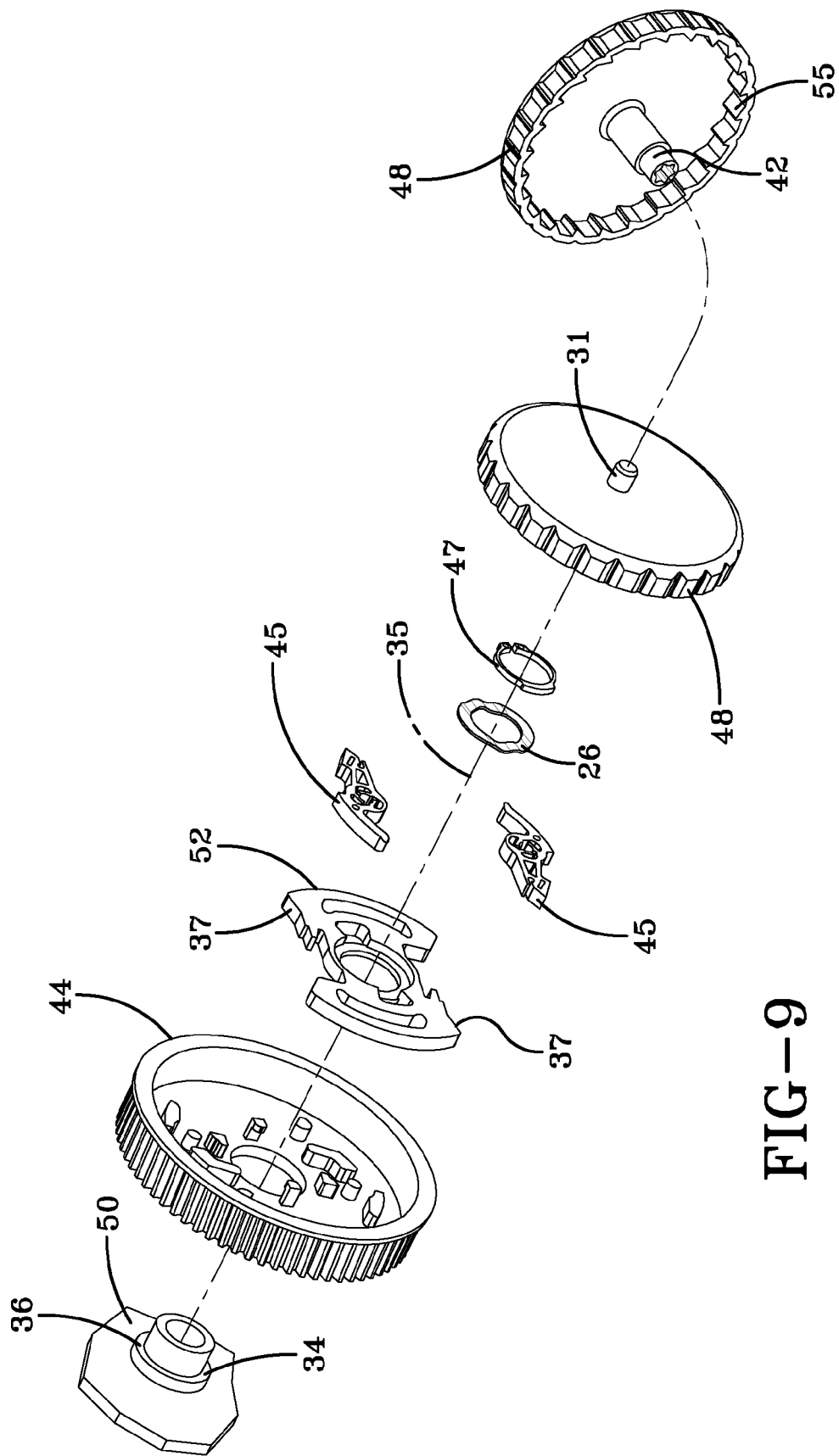
FIG. 9 in a perspective exploded view of components of the gear unit and clutch of the embodiment of FIGS. 7 and 8.

It is possible to use a displacement-sensitive clutch 41 like that shown in FIGS. 7, 8, and 9 instead of the inertia-sensitive clutch 41 shown in FIGS. 3 and 6. This displacement-sensitive clutch 41 has a corrugated washer 26 in a ring shape, replacing the sensor spring 6. The washer is held on the bearing journal 34 by a retaining ring 47 in the shape of an incomplete circle where the ends at the gap may have small holes for inserting special pliers to spread the ring apart, often referred to as a retaining ring or snap ring. The corrugated washer 26 rests against an inertial mass 52 with a predetermined frictional force. In this embodiment the clutch is designed to be displacement-sensitive wherein the inertial mass acts as the actuating element to actuate the clutch pawls 45 after the worm wheel 44 has completed a predetermined rotation.

A control gear 48 is mounted in a rotatable manner coaxial with the worm wheel 44 on the bearing journal 34. A hollow shaft stub that forms the force-transmission element 42 is formed around a common axis 35 on which the control gear is molded (FIG. 2). The force-transmission element 42 is a hollow shaft stub mounted in a rotatable manner for the purpose of mounting in a rotatable manner within the hollow-shaped shaft stub 34 (FIGS. 2, 8) for connection to the other force-transmission element 11 provided on the seat belt retractor 1. A control gear 48 has an inner toothing 55 by which the clutch pawl 45 can engage the worm wheel 44 driven by the electric motor 32. As used herein and in the claims the term "toothing" has its normal meaning of a number of uniform projections on a gear.

The electric motor 32 and gear unit 40 disposed in the gear-unit housing 50 are combined into a modular component that forms the separate and fully functional drive module 30. The drive module 30 can be connected in a rotationally fixed manner to retractor frame 4 of seat belt retractor 1. A gear-unit housing 50 can be attached in a rotationally fixed manner by an appropriate fastening means, for example screws or rivet joints, to the retractor frame 4 of seat belt retractor 1. The fastening means provided for this purposes, for example screws 53, can simultaneously function to attach the mechanism housing 60 and the drive module 30 to the retractor frame 4. The adjoining flat parts on the seat belt retractor 1, in particular on the mechanism housing 60 and on the gear-unit housing 50, can be matched to each other to effect an interlocking connection. The lateral housing opening is closed by a housing cover plate 58 fixed to gear-unit housing 50.

During assembly, a non-interlocking and interlocking connection is created between the force-transmission element 42, which is a hollow shaft stub and molded on to control gear 48, and the force-transmission element 11 that forms the mechanical transmission interface 10. The drive motion generated by the motor 32 is transmitted through a gear unit 40 and through the engagement of the clutch pawl 45 with an inner toothing 55 of the control gear 48 to the force-transmission element 42. The torque is transmitted from the force-transmission element 42 through the force-transmission element 11 to the winding shaft 2.

In the inertia-sensitive design of the clutch 41 shown in FIGS. 3 and 6, an inertial mass 52 initially remains in its start position when the worm wheel 44 is driven, whereas pawls 45, which are mounted on the worm wheel 44, move together with this wheel in the driven direction. The clutch pawls 45 with a control surface 37 move up against the inertial mass 52 and are made to engage the inner toothing 55 on the control gear 48 in response to a further rotation.

In the displacement-sensitive clutch 41 shown in FIGS. 7 through 9, the inertial mass 52 is pressed against a bearing journal tier 36 provided in the bearing journal 34, and thus initially retained in its start position. After the control gear 44 and the clutch pawls mounted thereon have traversed a selected arc of rotation, the clutch pawls 45 move up against the control surfaces 37 of the inertial mass 52 and in response to further rotation engage the inner toothing 55 of the control gear 48. As was already explained, the drive torque generated by the electric motor 32 is then transmitted to the winding shaft 2.

In the clutches shown, a worm wheel 44 and an inertial mass 42 are mounted at different radii of a stepped bearing journal 34 (FIGS. 2 and 8). A ratchet wheel 44 is mounted in a rotatable manner on the step having the greatest radius, while the inertial mass 52 is mounted in a rotatable manner on the step having the smallest radius. The ratchet wheel 44, inertial mass 52, and control gear 48 are mounted in a rotatable manner about a common axis 35 that is aligned with the axis of winding shaft 2 of the seat belt retractor.

A shaft stub 31 is molded on to the outside of a control gear 48. The shaft stub is pivotably mounted in a bearing cutout 33 on a housing cover plate 58. This enables an additional securing to be achieved for the position of the rotational clutch parts relative to the gear-unit housing 50.

In the embodiment of FIGS. 1 and 3, the winding shaft and motor shaft are disposed parallel to each other. In the embodiment shown in FIGS. 4 and 5, the winding shaft and the motor shaft are disposed at right angles relative to each other. In this embodiment the gear unit in drive module 30 is simplified because the motor output shaft can also function as the gear shaft 49.

In the embodiment of FIGS. 4 and 5, an electric/electronic control device 56 for the electric motor 32 can be disposed in a housing compartment 57 molded to gear-unit housing 50. It is also possible to integrate the electric/electronic control device for electric motor 32 into the on-board computer of a motor vehicle.

Depending on the driving situation, the torque of the electric motor can be controlled by the control device to generate appropriate torques for belt force limitation, or belt pretensioning, or belt wear comfort, or release of the locking of the winding shaft, or retraction of the belt webbing into its park position.

It is also possible to provide a seat belt retractor 1 without a motive spring 6 on the spring side 14. In such an embodiment, the motive spring can be integrated into the drive module 30 and disposed, for example in a gear-unit housing 50. In such an embodiment, the wear comfort function, by which the contact force of the seat belt on the body is able to be adjusted, can be integrated into the drive module 30.

In terms of belt force limitation following the power tensioning action, an end of the torsion bar 20 situated on the mechanism side 12 is locked against rotation by the locking device 16. A section of the torsion bar situated between the locked torsion bar end and a connection point 24 of the torsion bar 20 together with winding shaft 2 is torqued during the belt force limitation action.

To release the locking, the electric motor 32 can be driven in the direction of seat belt retraction, wherein this motion is transmitted through the engaged clutch 41 to the winding shaft and the locking component connected to winding shaft 2, for example the locking pawl of locking device 16 to release the locking.

Figure 10:
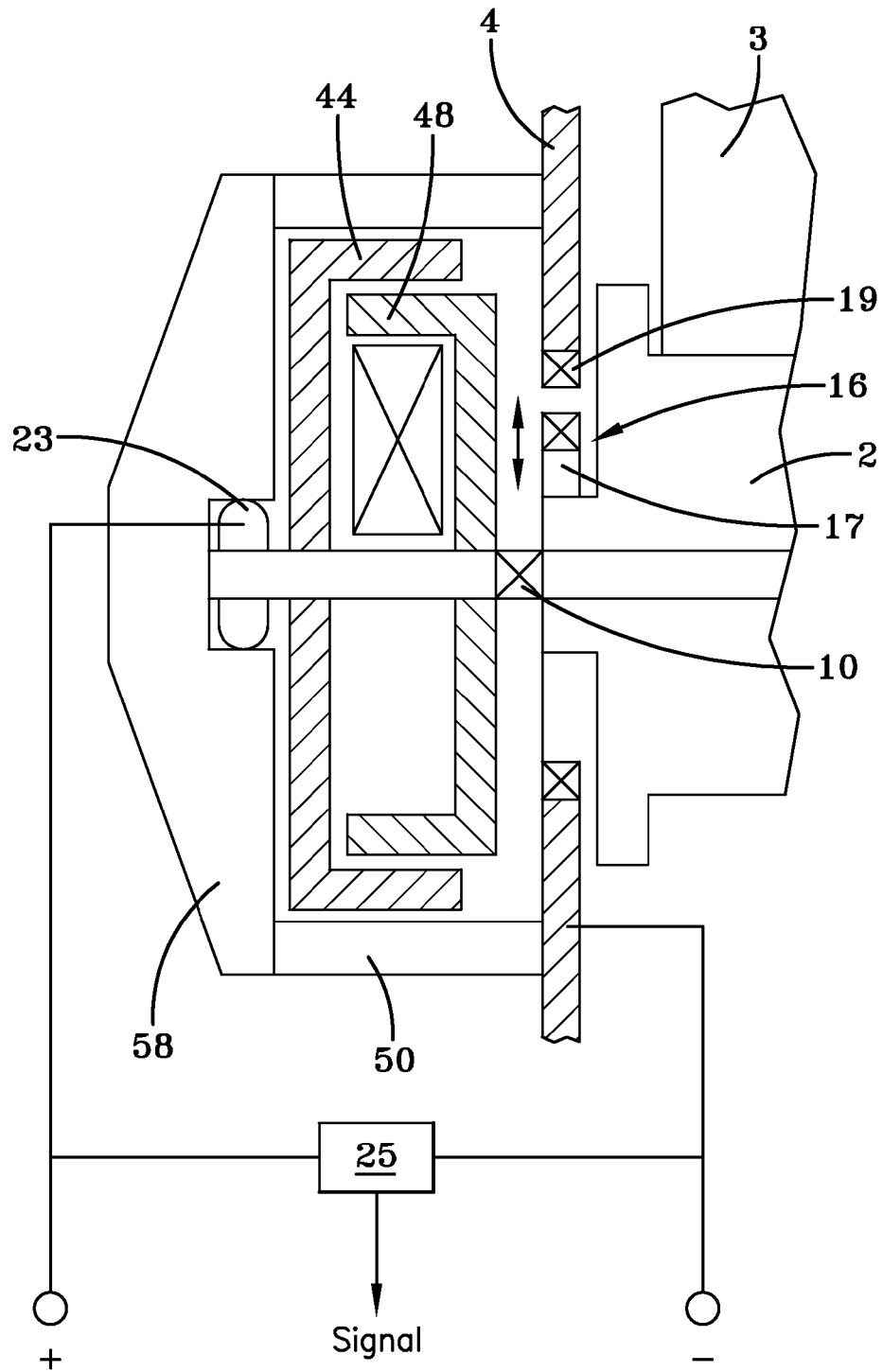
FIG. 10 is a schematic view of another embodiment including monitoring of the winding shaft locking.

In the embodiment shown in FIG. 10, an electrical/electronic monitoring device is provided by which the state of locking device 16 can be detected. This locking device 16 is a mechanical locking device that can function in an inertia-sensitive manner. It is possible to apply an electrical potential difference, in particular an electrical direct-current voltage, between the retractor frame 4 and the winding shaft 2. The retractor frame to be attached to the vehicle body is preferably grounded electrically, while the winding shaft is connected to a higher electrical potential, for example to the positive terminal of the electrical voltage source. A locking pawl 17 mounted on the winding shaft can engage a locking toothing 19 on the retractor frame 4 counter to the force of a spring (not shown). Alternatively a locking device 16 can comprise a locking pawl mounted on the retractor frame 4 to engage a locking toothing provided on winding shaft 2. For the purpose of monitoring the given state of the locking device 16, an electrical direct current voltage is applied between the winding shaft 2 and the retractor frame 4 to generate a difference in electrical potential between the retractor frame 4 and the winding shaft 2. The retractor frame 4 is electrically grounded. The electrical voltage can be applied to a metal bearing 23 that functions to support the rotational clutch components and the force-transmission elements on housing cover 58. When the locking pawl 17 is disengaged from the locking toothing 19 on the retractor frame 4 during normal driving operation, as shown in FIG. 10, the electrical potential difference corresponding to the direct current voltage is present at a signal transducer 25 to which the electrical direct-current voltage is also applied, as well as between the winding shaft 2 and the retractor frame 4. When the locking pawl 17 engages the locking toothing 19 to lock the rotation of the winding shaft 2, the retractor frame 4 and the winding shaft 2 are shorted. Put another way, a short circuit is affected by the locking position of the locking pawl between the winding shaft and the retractor frame. The resulting change in potential can be detected by a signal transducer 25 when the internal resistance of the signal transducer 25 is overridden and a signal is generated that indicates the locking has occurred and is interpreted as a locking signal. When the locking device or the locking pawl is released from its locking position, the direct-current voltage is re-established between the winding shaft and the retractor frame, and this can also be sensed by the signal transducer and a signal is generated. Once the locking pawl 17 is released from the toothing 19, the original direct-current voltage is again applied at the signal transducer 25. The signal then outputted by the signal transducer 25 indicates the released position of the locking pawl 17. It is also possible to locate the signal transducer 25 between the plus terminal and bearing 23, or between the minus terminal and the retractor frame 4. In this type of arrangement as well, the signal transducer 25 outputs corresponding signals as a function of the given position of the locking pawl 17. This aspect of the invention can find application both with the above-described kit and device for restraining a vehicle occupant as well as with seat belt retractors generally.

The drive module (30) and the electric motor (32) can actuate the winding shaft (2) in various driving situations. For example, such functions can be generated as seat belt wear comfort, return of the seat belt to a park position, seat belt tensioning, particularly in a pre-crash driving situation, and modification of the force limiting function in the event of a crash by corresponding adjustment of the torque supplied by the electric motor and of the rotational direction of the electric motor. To this end, for example, a motor control can be utilized such as that disclosed in U.S. Pat. No. 7,341,216 B2.

The configuration of the drive module on the mechanism side of the seat belt retractor containing the locking device allows for a simple information query of the main locking system. What is possible is a query of the unlocking system of the main locking system, after the winding shaft is tensioned, by a torque generated by the electric motor during a pre-crash driving situation or in response to a power tensioning during a crash with possible subsequent belt force limitation. In this release of the locking device, the winding shaft is rotated a predetermined rotational angle such that the locking device is released.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. An assembly for restraining a vehicle occupant comprising:
   a seat belt retractor that has a winding shaft mounted in a rotatable manner in a retractor frame to wind up and unwind a seat belt and a mechanical locking device for locking the winding shaft against rotation in a direction of unwinding the seat belt, and a force-transmission element connected to the winding shaft;
   a drive module having an electric motor, the drive module being connectable in a rotationally fixed manner to the retractor frame, force-transmission elements connected to the electric motor, said force-transmission elements are connected to each other for the purpose of transmitting the torque from the electric motor to the winding shaft; and
   a means for connecting the force transmission elements to one another.

2. The assembly according to claim 1 wherein the means for connecting the force transmission elements to one another is selected from the group comprising an interlocking engagement, a plug-in connection, and an interposed connecting element.

3. The assembly for restraining a vehicle occupant according to claim 1 wherein the mechanical locking device comprises a locking pawl mounted on the winding shaft and a locking toothing on the retractor frame.

4. The assembly for restraining a vehicle occupant according to claim 1 wherein the mechanical locking device comprises a locking pawl mounted on the retractor frame to engage a locking toothing provided on winding shaft.

5. The assembly according to claim 1 wherein a force limiter is provided that limits the force of the seat belt on a belted vehicle occupant when the mechanical locking device is activated.

6. The assembly according to claim 5 wherein the force limiter is a torsion bar disposed within the winding shaft.

7. The assembly according to claim 1 wherein the force-transmission elements are connected to each other by an interlocking engagement.

8. The assembly according to claim 1 wherein in that the force-transmission elements are connected to each other by a plug-in connection.

9. The assembly according to claim 1 further comprising a pyrotechnic power tensioner.

10. An assembly for restraining a vehicle occupant comprising:
    a seat belt retractor that has a winding shaft mounted in a rotatable manner in a retractor frame to wind up and unwind a seat belt and a mechanical locking device for locking the winding shaft against rotation in a direction of unwinding the seat belt, and a force-transmission element connected to the winding shaft;
    a drive module having an electric motor, the drive module being connectable in a rotationally fixed manner to the retractor frame, force-transmission elements connected to the electric motor, said force-transmission elements are connected to each other for the purpose of transmitting the torque from the electric motor to the winding shaft; and
    a means for connecting the force transmission elements to one another;
    wherein the drive module further comprises a clutch that in an engaged state transmits a torque generated by the electric motor to the force-transmission element.

11. The assembly according to claim 10 wherein the drive module further comprises a gear unit having a worm wheel in the form of a clutch carrier with which a worm gear meshes, the worm gear being coupled to the electric motor.

12. The assembly according to claim 11 wherein force-transmission element connected to the electric motor is mounted on the worm wheel.

13. The assembly according to claim 10 wherein the clutch is engaged in response to torque generated by the electric motor.

14. The assembly according to claim 10 wherein the clutch is either speed-sensitive or displacement-sensitive.

15. An assembly for restraining an occupant of a vehicle comprising two connectable components including a complete and operational belt seat belt retractor having a winding shaft mounted rotatably in a frame for winding up and unwinding the safety belt, and a separate drive module selectively connectable to the retractor, the drive module including an electric motor and which is non-rotatably connected to the frame, and force transmission elements are provided which when the retractor and module are connected, the force transmission elements join the electric motor and the winding shaft of the retractor and enable transmission of torque of the electric motor to the winding shaft.

* * * * *